(12) United States Patent
Vossenberg

(10) Patent No.: US 7,270,011 B2
(45) Date of Patent: Sep. 18, 2007

(54) COMBINED ABSOLUTE-PRESSURE AND RELATIVE-PRESSURE SENSOR

(75) Inventor: Heinz-Georg Vossenberg, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 11/110,103

(22) Filed: Apr. 19, 2005

(65) Prior Publication Data

US 2005/0241400 A1    Nov. 3, 2005

(30) Foreign Application Priority Data

Apr. 29, 2004    (DE) .................... 10 2004 021041

(51) Int. Cl.
*G01L 9/00* (2006.01)
(52) U.S. Cl. ......................................... 73/754
(58) Field of Classification Search ................. 73/715, 73/716, 717, 719, 720, 754; 361/283.4; 29/25.41
See application file for complete search history.

(56) References Cited

U.S. PATENT DOCUMENTS

| 4,054,497 | A | * | 10/1977 | Marshall ..................... 205/656 |
| 4,322,980 | A | * | 4/1982 | Suzuki et al. ................. 73/727 |
| 5,437,189 | A | * | 8/1995 | Brown et al. ................. 73/721 |
| 5,770,883 | A | | 6/1998 | Mizuno et al. |
| 6,051,853 | A | * | 4/2000 | Shimada et al. ............ 257/252 |
| 6,272,928 | B1 | * | 8/2001 | Kurtz ........................... 73/721 |
| 6,688,181 | B1 | * | 2/2004 | Clerc et al. .................. 73/715 |
| 6,945,115 | B1 | * | 9/2005 | Wang ........................... 73/718 |

FOREIGN PATENT DOCUMENTS

| DE | 42 27 893 | 4/1993 |
| DE | 44 02 085 | 8/1994 |
| DE | 100 32 579 | 1/2002 |
| DE | 101 38 759 | 3/2003 |

\* cited by examiner

*Primary Examiner*—Jewel Thompson
(74) *Attorney, Agent, or Firm*—Kenyon & Kenyon LLP

(57) ABSTRACT

A micromechanical sensor for measuring at least a first pressure of a first medium, as well as a method for manufacturing such a micromechanical sensor. The micromechanical sensor has at least one substrate having at least two sensor elements, which are preferably made of a semiconductive material. The substrate has at least a first sensor element for measuring an absolute-pressure variable of the first medium and a second sensor element for measuring a relative-pressure variable of the first medium.

7 Claims, 1 Drawing Sheet

COMBINED ABSOLUTE-PRESSURE AND RELATIVE-PRESSURE SENSOR

FIELD OF THE INVENTION

The present invention relates to a micromechanical pressure sensor and a method for manufacturing a micromechanical pressure sensor, where a substrate has at least two sensor elements for measuring pressure.

BACKGROUND INFORMATION

German Patent Application No. DE 42 27 893 describes a differential-pressure sensor, which has two semiconductor diaphragms. The semiconductor diaphragms are each provided with interconnected piezoresistive resistors on the upper side. To protect the sensitive sensor elements, the upper sides of the semiconductor diaphragms are situated in a common reference chamber, which can be hermetically sealed.

In addition to the measurement of a differential pressure, the measurement of an absolute pressure with the aid of micromechanical pressure sensors is also known from the related art. Thus, for example, German Patent Application No. DE 100 32 579 describes the manufacture of such an absolute-pressure sensor, where a cavity and a diaphragm situated above the cavity are produced, using variably porosified regions and subsequent thermal treatment. German Patent Application No. DE 101 38 759 describes an elaboration on this principle, where variably doped regions are used for producing the cavity and the diaphragm.

A method, by which both a differential-pressure sensor and an absolute-pressure sensor can be manufactured, is known from German Patent Application No. DE 100 32 579. In a first step, a first porous layer is initially formed in a semiconductor substrate, and in a second step, a hollow space or cavity is formed under or from the first porous layer in the semiconductor substrate, using an external access opening.

In very general terms, the pressure signals of a micromechanical pressure sensor may be acquired on the diaphragm, using both capacitive dielectric layers and piezoresistive resistors. In this context, an evaluation circuit may be mounted in direct proximity to the sensor element necessary for detecting the pressure signal, on the same substrate as the sensor element.

SUMMARY OF THE INVENTION

The present invention relates to a micromechanical sensor for measuring at least a first pressure of a first medium, as well as a method for manufacturing such a micromechanical sensor. In this context, it is provided that the micromechanical sensor have at least one substrate having at least two sensor elements, which are preferably made of a semiconductive material. An essence of the present invention is that the substrate has at least one first sensor element for measuring an absolute-pressure variable of the first medium and a second sensor element for measuring a relative-pressure variable of the first medium.

In comparison with a simple pressure sensor, an integrated absolute-pressure/relative-pressure sensor allows an expansion of functionality, combined with reduced cost and increased reliability. Thus, in safety-related applications, there is the possibility of conducting safety checks and plausibility checks of the obtained data. In this context, both the relative and absolute pressure data are recorded at the same location. The falsification of a measured value due to different measuring locations and/or temperatures, which would be possible, for example, in the case of separate sensor elements in a double housing or two separate housings, does not occur. The direct proximity of the two sensor elements allows for the measurement of the pressure variables at the same temperature to contribute to a measurement accuracy which is greater than that in the case of a "two-chip solution". Consequently, the provided integration may replace two individual sensors. This allows a high potential for both saving space in the construction and connection techniques and reducing chip costs. This markedly improves the reliability of the system in comparison with a two-sensor system (possibly having two different housings, as well).

In a particular refinement of the present invention, it is provided that the first sensor element, which measures the absolute-pressure variable, be able to be controlled independently of the second sensor element, which measures the relative-pressure variable. Of course, it may be provided that the relative-pressure variable is also able to be measured independently of the absolute-pressure variable. By suitably positioning evaluation circuits, the measured pressure variables of the two sensor elements may be evaluated independently of one another, as well. It is advantageously provided that the substrate having the two sensor elements has at least a part of a circuit. The circuit or the part of the circuit is provided for operating at least one of the sensor elements and/or for measuring and/or evaluating at least one of the pressure variables. In this context, a special refinement of the present invention may provide that each sensor element is assigned at least a part of a circuit, so that the measuring and/or the evaluation of the pressure variable of the two sensor elements may be conducted independently of one another.

In a further refinement of the present invention, it is provided that the first sensor element have at least one diaphragm and/or one cavity and/or one piezoelectric resistor and/or one dielectric layer. In this context, it is particularly provided that the cavity have a pressure, preferably a vacuum, that is constant with respect to the ambient pressure of the first medium.

In addition, for the second sensor element, it may be provided that it have at least a diaphragm and/or a piezosensitive resistor and/or an open cavity. In this context, it is particularly provided that the cavity be open from the back of the substrate, i.e. from the side of the substrate opposite to the diaphragm. In the same way, it may be advantageously provided that the open cavity have a second medium at a second pressure. Therefore, it can be provided, for example, that both the first pressure of the first medium and the second pressure of the second medium are applied to the diaphragm, which borders on the cavity. The pressure difference between the first and the second pressures may then be measured, using the change in position or the deformation of the diaphragm. This is advantageously accomplished by applying piezoresistive resistors to the diaphragm.

Advantageously, the absolute-pressure sensor is produced using manufacturing processes of surface micromechanics (SMM), and the relative-pressure sensor is produced using the manufacturing processes of bulk micromechanics (BMM). Thus, e.g. it is conceivable for a dielectric layer to be produced by selectively doping the semiconductor substrate. In addition, it is conceivable to produce an opening in the cavity of the second sensor element with the aid of a micromechanical manufacturing process, such as a trench-etching process or a different etching process. However, in addition to the sensor elements, the circuit or at least a part of the circuit may also be produced by a micromechanical manufacturing process.

In general, it is possible to coordinate the micromechanical steps for manufacturing the different sensor elements and the circuit parts with each other, individual process steps being able to be carried out simultaneously or in succession.

DETAILED DESCRIPTION

Figure 1:
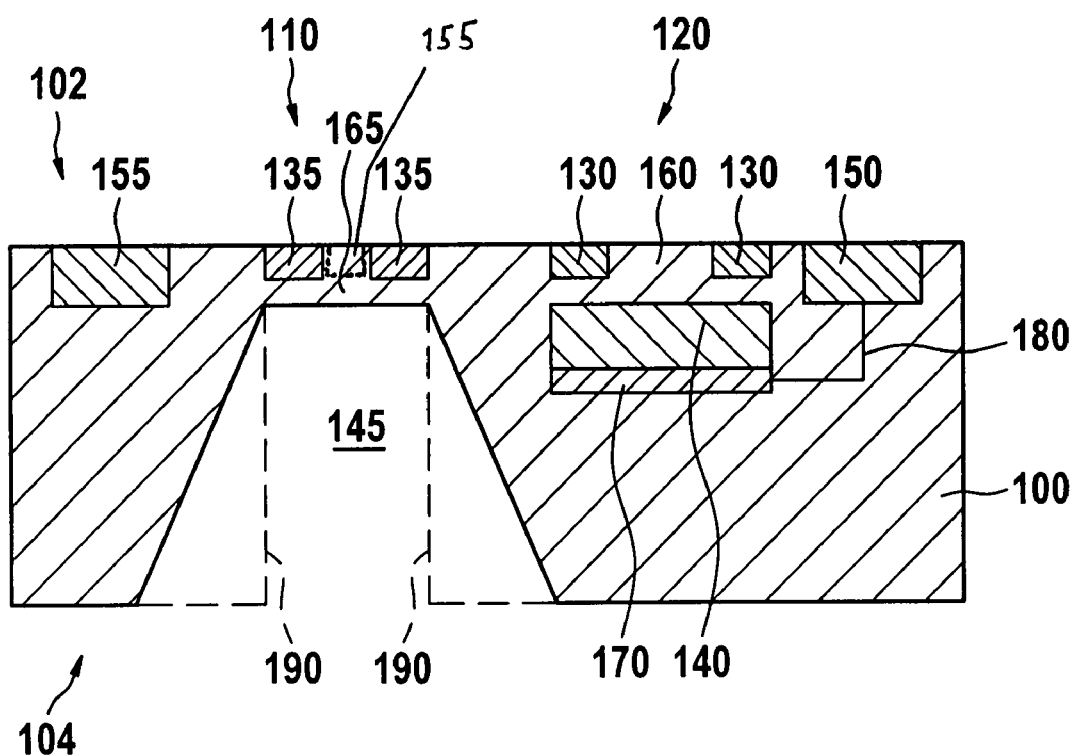
FIG. 1 shows an example of a combined absolute-pressure/relative-pressure sensor of the present invention.

In FIG. 1, a combination of an absolute-pressure sensor 120 and a relative-pressure sensor 110 according to the present invention is illustrated, using a specific exemplary embodiment. In this context, the sensor elements, which are required for measuring the two pressure variables, have been produced in or on a common substrate 100. Since it is already known from the related art, that a relative-pressure sensor or differential-pressure sensor 110 can be produced from a semiconductor substrate 100 in the same way as an absolute-pressure sensor 120, using micromechanical manufacturing processes, only the special features of the combination of the two pressure sensors will be discussed in the following description. For the standard production of an absolute-pressure sensor and a relative-pressure sensor by micromechanical manufacturing processes, reference is made to the related art mentioned above.

As is evident from FIG. 1, relative-pressure sensor 110 is made up of a diaphragm 165 and a cavity 145, which are preferably produced with the aid of manufacturing processes of bulk-micromechanics (BMM). In this context, cavity 145 is open to back side 104 of substrate 100. Such an opening, as it is illustrated in FIG. 1, may be produced by suitable micromechanical etching processes and/or trench processes. When a KOH etching process is used, oblique edge angles of the cavern can be seen, whereas in the case of forming trenches, steeper cavity walls are formed, as are indicated by dashed lines 190. In order to measure pressure or calculate a pressure variable, piezoresistive resistors 135 are positioned on diaphragm 165. In this context, these piezoresistive resistors 135 may be produced both in diaphragm 165, inside the semiconductor material of substrate 100, and on diaphragm 165, using a further material on front side 102 and/or back side 104 of substrate 100.

In order to the allow piezoresistive resistors 135 to be interconnected and the measured pressure variable to be evaluated, a circuit 155 is produced on substrate 100. This circuit 155 may be integrated into substrate 100, as well as separately applied to substrate 100. Even (partial) integration of the circuit onto diaphragm region 165 is conceivable. It is equally conceivable for only connector elements to be provided on substrate 100 to transmit the pressure variable measured by piezoresistive resistors 135 to an external evaluation circuit.

In comparison with relative-pressure sensor 110, absolute-pressure sensor 120 is preferably produced by a surface-micromechanical (surface-micromachining) manufacturing process (SMM). In this context, a cavity 140 is produced in substrate 100, beneath a diaphragm 160. Diaphragm 160 may be provided with piezoresistive resistors 130 in the same way as relative-pressure sensor 110.

However, in the case of absolute-pressure sensor 120, the pressure variable may alternatively be determined with the aid of capacitance measurements. To that end, it is necessary that diaphragm 160 and a layer 170 opposite to diaphragm 160 have dielectric properties. In addition, in the case of this alternative measuring principle, it is necessary that evaluation circuit 150 assigned to absolute-pressure sensor 120 be connected to dielectric layer 170 by a separate connecting line 180.

In the case of relative pressure sensor 110, the pressure is generally measured in such a manner, that a first medium having pressure p1 acts from front side 102 and a second medium having pressure p2 acts from the back side of the diaphragm. In this context, it is quite possible for the first and second media to be identical, but to have different pressures. A difference in pressure between the two pressures (p1 not equal to p2) causes diaphragm 165 to deflect to the side of the lower pressure. At the same time, piezoresistive resistors 135 or a piezoresistive resistance circuit situated on diaphragm 165 also deflect with diaphragm 165 and consequently generate an electrical (pressure) variable proportional to the deformation and the pressure difference. This electrical pressure variable may then be further processed by evaluation circuit 155.

The measurement of the pressure variable with the aid of absolute-pressure sensor 120 is carried out in a similar manner, but chamber 140 has a pressure p0 predetermined during the manufacture of the pressure sensor. This is accomplished in that chamber 140 is hermetically sealed off from the environment by diaphragm 160 and substrate 100. In this context, it is advantageously provided that chamber 140 contains a vacuum or has a defined pressure (using, for example, special functional gases). As previously described, piezoelectric resistors 130 on diaphragm 160 can generate a pressure variable proportional to the pressure difference between pressure p1 of the first medium on front side 102 of diaphragm 160 and pressure p0 in chamber 140. For purposes of further processing, the pressure variable generated in this manner may then be processed in an evaluation circuit 150 assigned to absolute-pressure sensor 120.

As an alternative to measuring the pressure variable with the aid of piezoresistive resistors 130 or piezoresistive resistance layers in or on diaphragm 160, a capacitance measurement may also be made as a function of the diaphragm deflection. In this context, it is, however, necessary for the diaphragm to have at least one conductive (partial) layer. The pressure-dependent deflection of the diaphragm then allows a change in the capacitance to be determined in a layer 170, which is opposite to diaphragm 160 and has at least one conductive (partial) layer, as well.

One option for producing a corresponding conductive (partial) layer, both in diaphragm 160 and underneath cavity 140, is to suitably dope the semiconductive material of substrate 100.

To produce a combined absolute-pressure/relative-pressure sensor, the micromechanical manufacturing processes necessary for producing an individual pressure sensor may be combined. Thus, it is conceivable, for example, to produce diaphragm 160 and diaphragm 165 within the same manufacturing step. In the same way, piezoresistive resistors 130 and 135 and circuits 150 and 155 may be manufactured concurrently.

What is claimed is:

1. A micromechanical sensor for measuring at least a first pressure of a first medium, comprising:
   at least one substrate, the substrate including at least two sensor elements, the at least two sensor elements including a first sensor element measuring an absolute-pressure variable of the first medium and a second sensor element measuring a relative-pressure variable of the first medium, wherein the second sensor element includes a diaphragm, and wherein at least one evaluation circuit configured to evaluate the relative-pressure variable is integrated into the diaphragm of the second sensor element.

2. The sensor according to claim 1, wherein the substrate is composed of a semiconductive material.

3. The sensor according to claim 1, wherein the absolute-pressure variable and the relative-pressure variable are at least one of measured and evaluated independently of each other, the pressure variables being evaluated together.

4. The sensor according to claim 1, wherein the first sensor element includes at least one of:
(a) a diaphragm,
(b) a cavity,
(c) a piezoelectric resistor, and
(d) a dielectric layer,
wherein the cavity has a predetermined pressure, as opposed to an ambient pressure of the first medium.

5. The sensor according to claim 4, wherein the predetermined pressure is a vacuum.

6. The sensor according to claim 4, wherein at least one of the substrate and the diaphragm has at least a part of a circuit, the circuit being for at least one of measuring and evaluating at least one of the pressure variables.

7. The sensor according to claim 1, wherein the second sensor element further includes at least one of:
(a) a piezosensitive resistor, and
(b) an open cavity,
wherein an opening of the cavity leads to a side of the substrate opposite to the diaphragm,
wherein the open cavity has a second medium at a second pressure, and
wherein the relative-pressure variable represents a pressure difference between the first pressure and the second pressure.

* * * * *